Sept. 25, 1951 J. E. SCHNEIDER 2,569,077
ANTISKID CHAINS FOR PNEUMATIC TIRES
Filed Oct. 14, 1947 2 Sheets-Sheet 1

Inventor
John E. Schneider

By *Clarence A. O'Brien
and Harvey B. Jacobson*
Attorneys

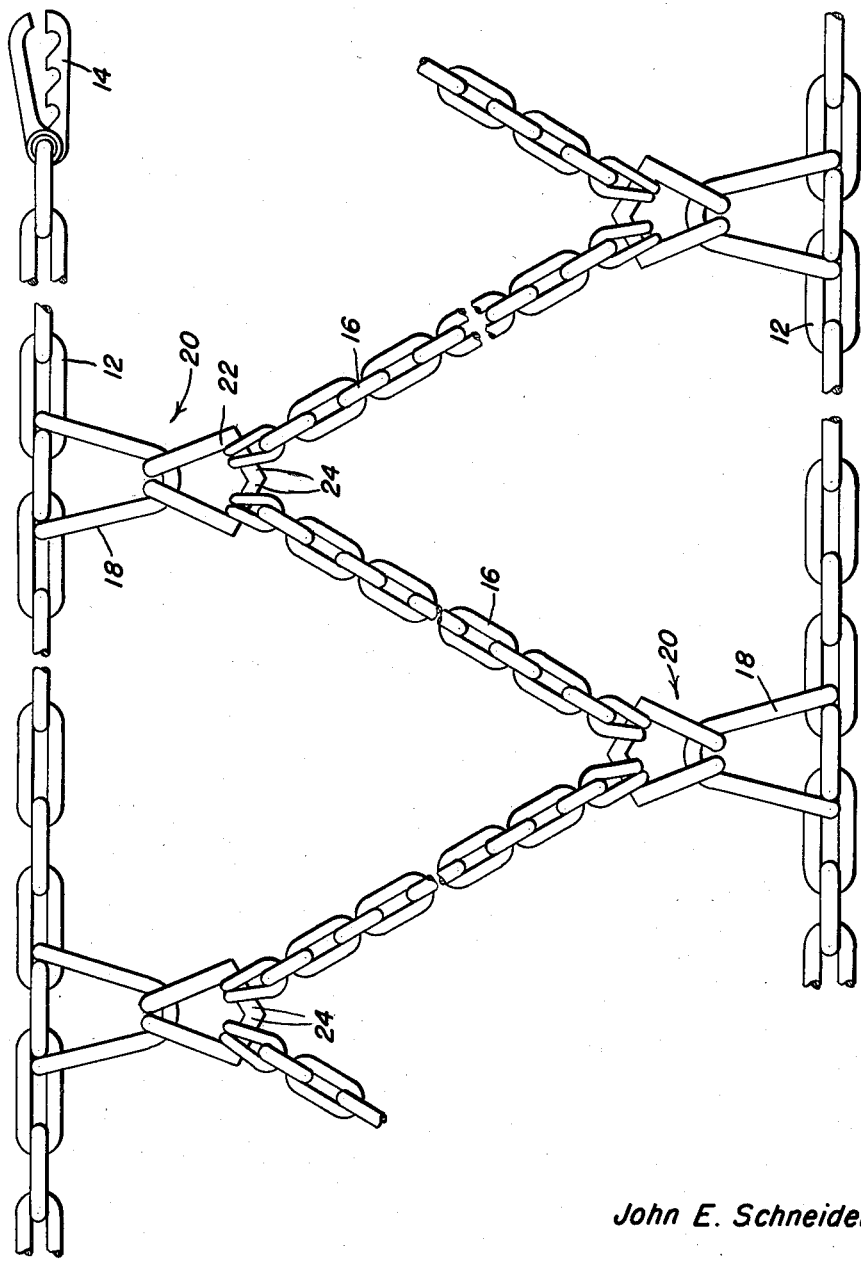

Patented Sept. 25, 1951

2,569,077

UNITED STATES PATENT OFFICE 2,569,077

ANTISKID CHAINS FOR PNEUMATIC TIRES

John E. Schneider, Minisink Hills, Pa.

Application October 14, 1947, Serial No. 779,685

3 Claims. (Cl. 152—239)

This invention comprises novel and useful improvements in anti-skid chains for pneumatic tires and more specifically pertains to a readily mounted anti-skid chain for tires having an improved road-gripping action and construction.

The purpose of this invention resides in providing an anti-skid chain of the type well known for use with pneumatic tires of automotive vehicles which shall have an increased road engaging area and an improved anti-skid action, and which shall be more efficient in operation, of longer life, and easy to install and remove from a tire.

The invention is particularly characterized by a zig-zag arrangement of the cross chain of the device to thereby increase the area of the cross chains which engage the road surface at one time, thereby promoting the anti-skid characteristics of the device.

A further feature of the invention resides in a construction of anti-skid chain wherein each cross chain of the device shall be simultaneously attached to non-adjacent links of the chain rim or foundation chain of the device, to thereby distribute the strain transmitted between the links more evenly throughout the entire chain structure.

These, together with various ancillary objects of the invention which will later become apparent as the following description proceeds, are attained by this device, a preferred embodiment of which has been illustrated, by way of example only, in the accompanying drawings, in which:

Figure 3 is an enlarged fragmentary plan view of a portion of the anti-skid chain device, showing more clearly the manner of arranging the cross chains in zig-zag formation together with the fastening means therefor.

Figure 2:
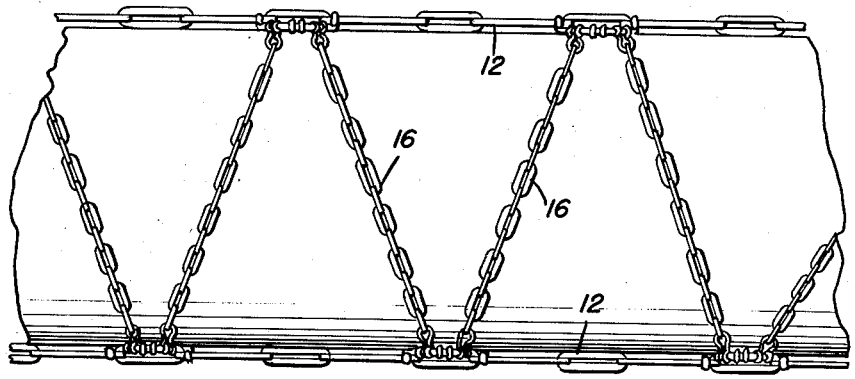
Figure 2 is a fragmentary end elevational view of the arrangement of Figure 1 showing the cross chains arranged in zig-zag fashion upon the tread of the tire.

Referring now more specifically to the accompanying drawings, wherein like numerals designate similar parts throughout the various views, the reference character 10 denotes a pneumatic tire of any suitable type mounted upon a vehicle wheel, although it will be understood that the principles of the invention while chiefly applicable thereto are not limited to this type of tire but may be employed with a solid tire or in fact any other vehicle wheel and tire.

In accordance with conventional practice in the art of designing and making tire chains, there are provided a pair of foundation chains 12, which form the sides of the tire chain assembly and which are provided with the customary detachable coupling or fastening members 14 at one end of each chain, whereby the chain may be formed into an endless band or rim when applied to a tire.

As will be readily understood, one of these chains 12 will be applied to the inside and one to the outside of a vehicle wheel, with the cross chains 16 extending therebetween. It should be noted, however, that if desired, the foundation chain or chain rim 12 may be replaced by any other suitable flexible rim member to which the cross chains may be applied.

The cross chains 16 are of conventional type and construction, except that they are somewhat shorter than is common with conventional design, and are arranged in a zig-zag pattern about the circumference of the tire upon the tread thereof, being attached by suitable connecting means to the chain rim 12. For this purpose, a plurality of terminal links 18 are secured to each of the chain rims 12, at spaced points longitudinally thereof, the terminal links of the two rims being staggered or interdigitated with respect to each other, whereby the connecting cross chains may be disposed in a zig-zag formation. The terminal links 18 may be of any suitable height, it being merely essential that they engage non-adjacent links of the chain 12, or spaced points of any other chain rim which is provided. This is for the purpose of departing the strain imposed by the cross links during use of the device, to longitudinally spaced points throughout the links of the chain rim, to equalize the forces applied thereto.

As shown, the terminal chain 18 is preferably V-shaped, with a rounded apex portion and having the outer extremities of its leg hinged or swivelled to alternate, non-adjacent links of the foundation or chain rims 12.

Linked in the apex of the terminal links 18, is an attaching link indicated generally at 20, and which is provided with a pair of diverging leg members 22, whose inner extremities are linked into the apex of the terminal link 18, and whose outer extremities are integrally connected by angularly disposed portions 24, these portions being so related that they are disposed perpendicular to the longitudinal axis of the cross chain 16, the adjacent extremities of adjacent cross chains being swivelly connected to the same fastening or coupling link 20, as shown best in Figure 3.

It will thus be seen that each of the connecting links 22 is subjected to the thrust of two adjacent cross chains which thrusts have longitudinal components relative to the tread of the tire, which balance each other and tend to eliminate to some extent creeping of the chain about the tire.

Figure 1:
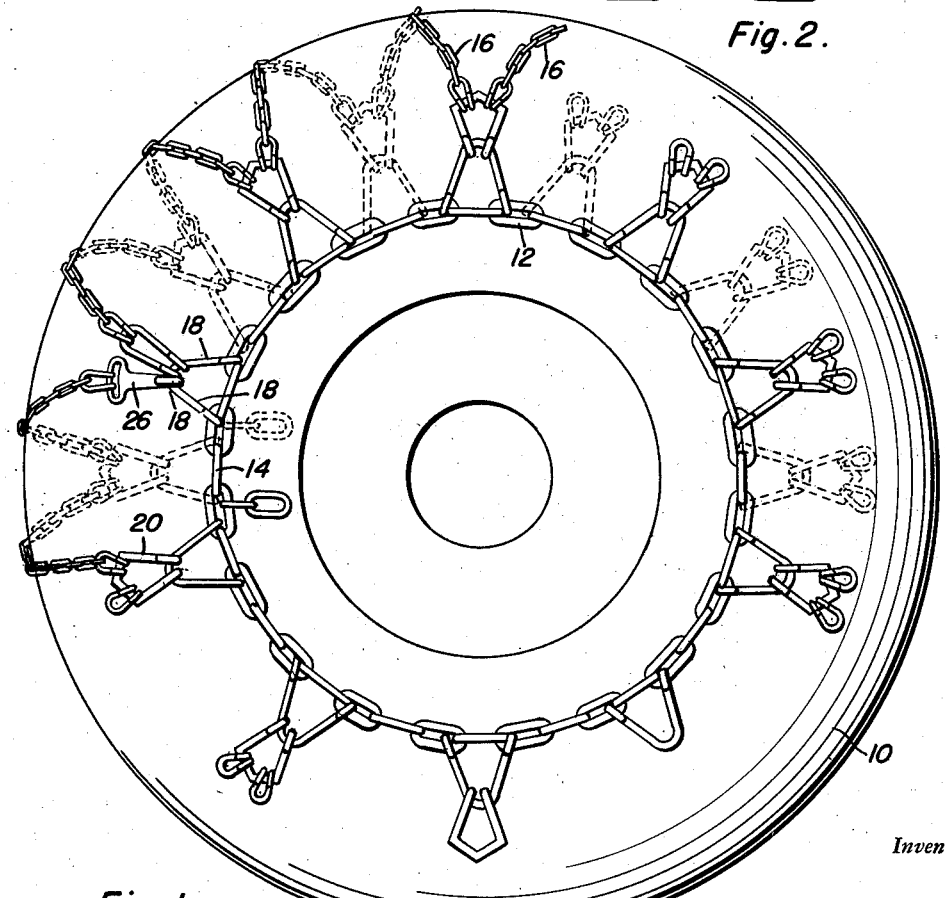
Figure 1 is a side elevational view of a wheel of an automotive vehicle with a pneumatic tire and showing a portion of the anti-skid chain of the invention applied thereto.

As shown more clearly in Figure 1, the end cross chain which is adjacent each end of the chain assembly is not directly connected or fastened at both of its extremities to the foundation chains, but at one end thereof is provided with a detachable fastener 26 which is detachably engageable with the end-most terminal link 18, whereby the end cross links may be easily attached and with even tension to the chain rims with the same tightness as the other cross links, as the device is applied to a tire.

The advantages of the foregoing construction will be now readily understood. By means of the zig-zag chain arrangement, there is a greater area of gripping engagement between the chain and the surface of the road, since there is always at least one chain interposed between the tire tread and the road, and sometimes two or more, depending upon the closeness of the spacing of the chains. Further, the length of the cross chain is less than in accordance with conventional practice, and consequently any break in a cross chain due to wear or other causes leaves a shorter free end to spring outwardly and strike against the center or other surface, thereby minimizing noise and damage caused by breakage. Further, the strain imparted by the cross chains to the foundation chains or chain rims and thence to the tire itself is minimized since the terminal links transmit this thrust or strain to at least two, non-adjacent links, or spaced portions of the chain rim.

From the foregoing, it is believed that the manner of constructing and utilizing the improved chain forming the subject of this invention will be readily understood, and accordingly further explanation is believed to be unnecessary.

Since numerous modifications and equivalents will readily occur to those skilled in the art after a consideration of the foregoing specification and accompanying drawings, it is not desired to limit the invention to the exact construction shown and described, but all suitable modifications and equivalents may be resorted to falling within the scope of the appended claims.

Having described the invention, what is claimed as new is:

1. A tire chain including side chains for disposition on opposite sides of a tire, a plurality of cross chains adapted to overlie the tread of a tire in zig-zag fashion, and means for securing adjacent ends of adjacent cross chains to said side chains, said means including a link having diverging arms and a substantially V-shaped member interconnecting the outer extremities of said arms, each of said adjacent ends being swiveled to one of the legs of said V-shaped member.

2. The combination of claim 1 wherein said link is secured to a terminal link, said terminal link being attached to non-adjacent links on said side chains.

3. The combination of claim 2 wherein said side chains are provided with coupling members at their extremities, the end cross chains being provided with fasteners each detachably engageable with one of said terminal links.

JOHN E. SCHNEIDER.

REFERENCES CITED

The following references are of record in the file of this patent:

UNITED STATES PATENTS

| Number | Name | Date |
| --- | --- | --- |
| 1,432,534 | Cochran | Oct. 17, 1922 |
| 1,742,655 | Knutsson | Jan. 7, 1930 |
| 2,453,325 | Karstens | Nov. 9, 1948 |

FOREIGN PATENTS

| Number | Country | Date |
| --- | --- | --- |
| 463,036 | Germany | 1928 |
| 786,078 | France | 1935 |